(12) United States Patent
Mori

(10) Patent No.: US 10,087,038 B2
(45) Date of Patent: Oct. 2, 2018

(54) REEL AND REEL COMPONENT PARTS

(71) Applicant: FUJIFILM CORPORATION, Minato-ku, Tokyo (JP)

(72) Inventor: Yasuhiro Mori, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 695 days.

(21) Appl. No.: 14/723,481

(22) Filed: May 28, 2015

(65) Prior Publication Data

US 2015/0353320 A1 Dec. 10, 2015

(30) Foreign Application Priority Data

Jun. 10, 2014 (JP) .................. 2014-120016
May 20, 2015 (JP) .................. 2015-102943

(51) Int. Cl.
*B65H 75/14* (2006.01)
*G11B 23/037* (2006.01)

(52) U.S. Cl.
CPC .......... *B65H 75/14* (2013.01); *G11B 23/037* (2013.01)

(58) Field of Classification Search
CPC .............................. B65H 75/14; G11B 23/037
USPC ....................................................... 242/608
See application file for complete search history.

(56) References Cited

U.S. PATENT DOCUMENTS

| | | | | |
|---|---|---|---|---|
| 4,044,965 A | * | 8/1977 | Posso | B65H 75/14 242/608.8 |
| 4,540,133 A | * | 9/1985 | Alsobrook | G11B 23/037 242/118.4 |
| 4,997,142 A | * | 3/1991 | Grant | B65H 75/14 156/309.6 |

(Continued)

FOREIGN PATENT DOCUMENTS

| | | |
|---|---|---|
| JP | S54-104318 A | 8/1979 |
| JP | H01-140678 U | 9/1989 |

(Continued)

OTHER PUBLICATIONS

English language translation of the following: Office action dated Apr. 4, 2017, from the JPO in a Japanese patent application No. 2015-102943 corresponding to the instant patent application. This office action translation is submitted now in order to supplement the understanding of the cited references which are being disclosed in the instant Information Disclosure Statement.

(Continued)

*Primary Examiner* — Michael E Gallion
(74) *Attorney, Agent, or Firm* — SOLARIS Intellectual Property Group, PLLC

(57) ABSTRACT

A reel including a hub that is formed from a resin and that has a bottomed circular cylindrical shape open at an upper end portion side, a lower flange that is provided at a lower end portion side of the hub and that is integrally formed to the hub, a ring shaped upper flange that faces toward the lower flange, and a weld portion where a lower face of the upper flange is joined to an upper end face of the hub. The (Continued)

weld portion is formed such that there is at least a region present where there are plural weld portions disposed side-by-side in the radial direction within any selected range of the hub having a central angle of 90 degrees in plan view.

12 Claims, 11 Drawing Sheets

(56) References Cited

U.S. PATENT DOCUMENTS

| | | | | |
|---|---|---|---|---|
| 6,758,428 | B1* | 7/2004 | Hiraguchi | G11L 315/66 |
| | | | | 242/345 |
| 6,896,217 | B1* | 5/2005 | Ishikawa | G11B 23/043 |
| | | | | 242/348 |
| 8,851,411 | B2* | 10/2014 | Mori | G11B 23/037 |
| | | | | 242/348.2 |
| 9,352,931 | B2* | 5/2016 | Mori | G11B 23/044 |
| 9,812,167 | B2* | 11/2017 | Sumiya | G11B 23/042 |
| 9,875,768 | B2* | 1/2018 | Sumiya | G11B 23/044 |
| 2007/0272790 | A1* | 11/2007 | Ishikawa | B65H 75/14 |
| | | | | 242/608 |
| 2007/0290090 | A1* | 12/2007 | Ishikawa | G11B 23/044 |
| | | | | 242/348 |
| 2008/0087760 | A1* | 4/2008 | Ishikawa | B65H 75/14 |
| | | | | 242/610.4 |
| 2010/0019077 | A1 | 1/2010 | Ishikawa et al. | |
| 2010/0123036 | A1* | 5/2010 | Ishikawa | B65H 75/30 |
| | | | | 242/348 |
| 2011/0186674 | A1* | 8/2011 | Hiraguchi | B32B 37/04 |
| | | | | 242/348 |
| 2013/0161430 | A1* | 6/2013 | Weissbrod | B21C 47/323 |
| | | | | 242/118.4 |
| 2013/0334353 | A1* | 12/2013 | Takenoshita | G11B 23/037 |
| | | | | 242/118.6 |
| 2014/0263817 | A1* | 9/2014 | Mori | G11B 23/044 |
| | | | | 242/600 |
| 2014/0263818 | A1* | 9/2014 | Mori | G11B 23/044 |
| | | | | 242/608.2 |
| 2015/0353320 | A1* | 12/2015 | Mori | B65H 75/14 |
| | | | | 242/614 |

FOREIGN PATENT DOCUMENTS

| | | | |
|---|---|---|---|
| JP | 2001-135063 A | | 5/2001 |
| JP | 2001135063 A | * | 5/2001 |
| JP | 2010-055739 A | | 3/2010 |
| JP | 2010-55739 A | | 3/2010 |
| WO | WO-2012117613 A1 | * | 9/2012 |

OTHER PUBLICATIONS

English language translation of the following: Office action dated Nov. 1, 2016, from the JPO in a Japanese patent application No. 2015-102943 corresponding to the instant patent application. This office action translation is submitted now in order to supplement the understanding of the cited references which are being disclosed in the instant Information Disclosure Statement.

* cited by examiner

US 10,087,038 B2

REEL AND REEL COMPONENT PARTS

CROSS-REFERENCE TO RELATED APPLICATIONS

This application is based on and claims priority under 35 USC 119 from Japanese Patent Application No. 2014-120016 filed on Jun. 10, 2014 and Japanese Patent Application No. 2015-102943 filed on May 20, 2015, each of which is incorporated by reference herein in its entirety.

BACKGROUND

1. Technical Field

The present invention relates to a reel and reel component parts.

2. Related Art

A resin reel is known that includes a bottomed circular cylindrical hub open at an upper end side, a lower flange integrally formed to the bottom end side of the hub, and a ring shaped upper flange that has an inner circumferential portion side of its lower face welded to the upper end face of the hub (see, for example, Japanese Patent Application Laid-Open (JP-A) No. 2010-55739 (Patent Document 1)).

In the reel described in Patent Document 1, the lower face of the upper flange is welded to the top end face of the hub at one location in side cross-section view. Other modes are also known for structures of welding between a hub and flanges (see, for example, Japanese Utility Model Application Laid-Open (JP-U) H01-140678 (Patent Document 2), and JP-A No. S54-104318 (Cited Document 3)).

However, the upper end portion side of the hub deforms due to the force of winding recording tape when recording tape has been wound onto a reel as described in Patent Document 1. The outer circumferential portion side of the upper flange then follows such deformation, so as to tilt to approach the lower flange side, and sometimes tilts more than the tilting of the hub in reality. There is accordingly room for improvement in structures to suppress the upper flange from deforming by as much as the deformation of the hub arising from the force of winding the recording tape, or greater.

SUMMARY

An object of the present invention is to obtain a reel and reel configuration component parts capable of suppressing an upper flange from deforming by as much as the deformation of a hub arising from the force of winding a recording tape, or greater.

A reel of a first aspect of the present invention is a reel including a hub that is formed from a resin and that has a bottomed circular cylindrical shape open at an upper end portion side, a lower flange that is provided at a lower end portion side of the hub and is integrally formed to the hub, a ring shaped upper flange that faces toward the lower flange, and a weld portion where a lower face of the upper flange is joined to an upper end face of the hub. The weld portion is disposed such that there is at least a region present where there are plural of the weld portions disposed side-by-side in the radial direction within any selected range of the hub having a central angle of 90 degrees in plan view.

Reel configuration component parts of a fourth aspect of the present invention include a hub that is formed from a resin and that has a bottomed circular cylindrical shape open at an upper end portion side, a lower flange that is integrally formed to the hub at a lower end portion side of the hub, a ring shaped upper flange that is to be provided facing toward the lower flange at an upper end portion side of the hub, and a welding rib for welding a lower face of the upper flange to an upper end face of the hub. The welding rib is formed to at least one out of the lower face of the upper flange or the upper end face of the hub, and the welding rib is disposed such that there is at least a region present where there are plural of the welding ribs disposed side-by-side in the radial direction within any selected range of the hub having a central angle of 90 degrees in plan view.

BRIEF DESCRIPTION OF THE DRAWINGS

An exemplary embodiment of the present invention will be described in detail based on the following figures, wherein.

DETAILED DESCRIPTION

Figure 1:
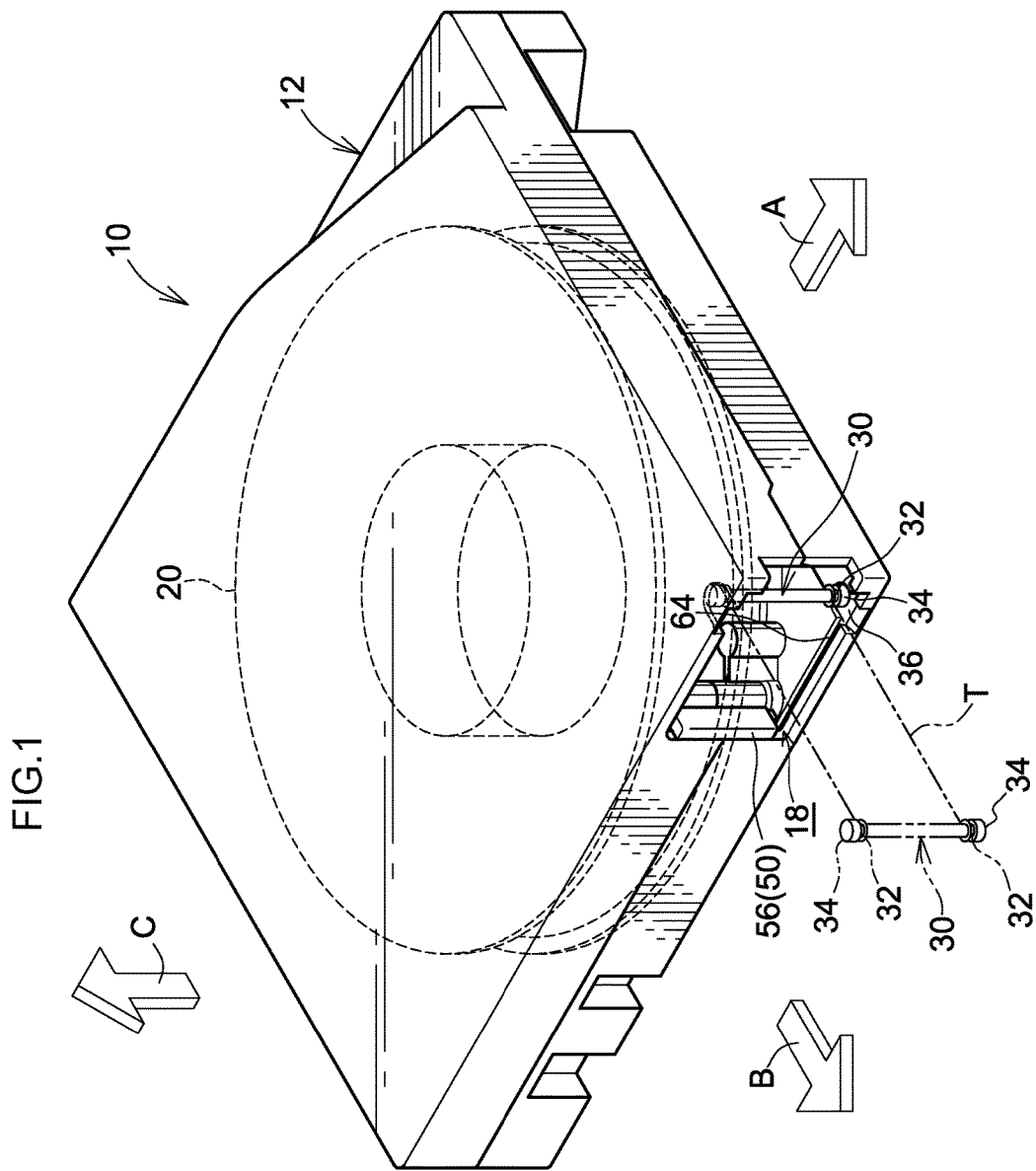
FIG. 1 is a perspective view of a recording tape cartridge provided with a reel according to the present exemplary embodiment.

Detailed explanation follows regarding an exemplary embodiment according to the present invention, with reference to the drawings. A reel 20 according to the present exemplary embodiment is applied to a recording tape cartridge 10 that houses a single reel inside a case 12. As illustrated in FIG. 1, for ease of explanation, arrow A indicates a loading direction of the recording tape cartridge 10 into a drive device, and this is referred to as the front direction (front side) of the recording tape cartridge 10.

A direction indicated by arrow B orthogonal to arrow A is referred to as the right direction (right side) of the recording tape cartridge 10, and a direction indicated by arrow C orthogonal to arrow A and arrow B is referred to as upward direction (upper side) of the recording tape cartridge 10 and the reel 20. The radial direction and the circumferential direction of the reel 20 are sometimes referred to below simply as the "radial direction" and the "circumferential direction".

Figure 2:
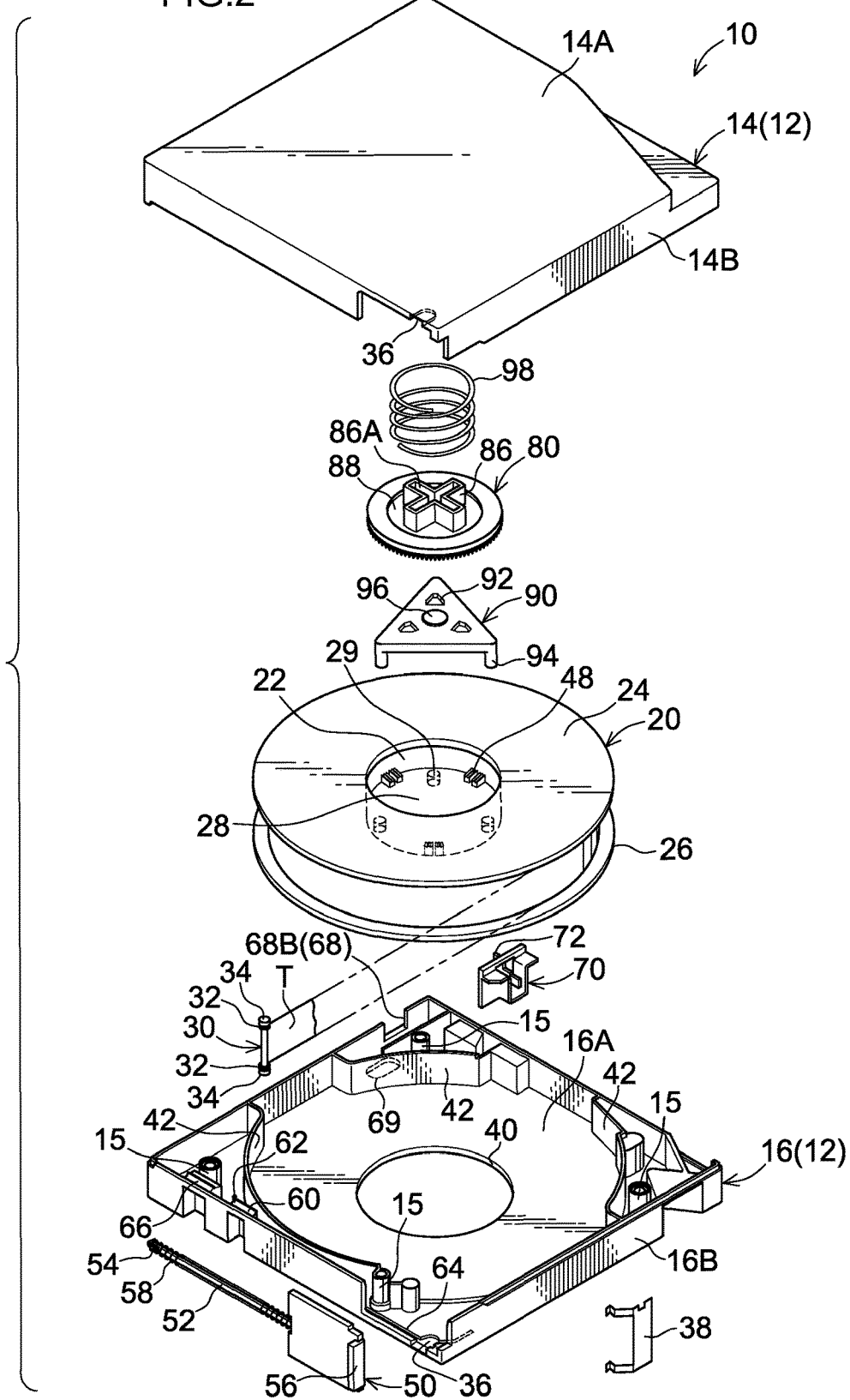
FIG. 2 is an exploded perspective view of a recording tape cartridge provided with a reel according to the present exemplary embodiment, as viewed from above.
Figure 3:
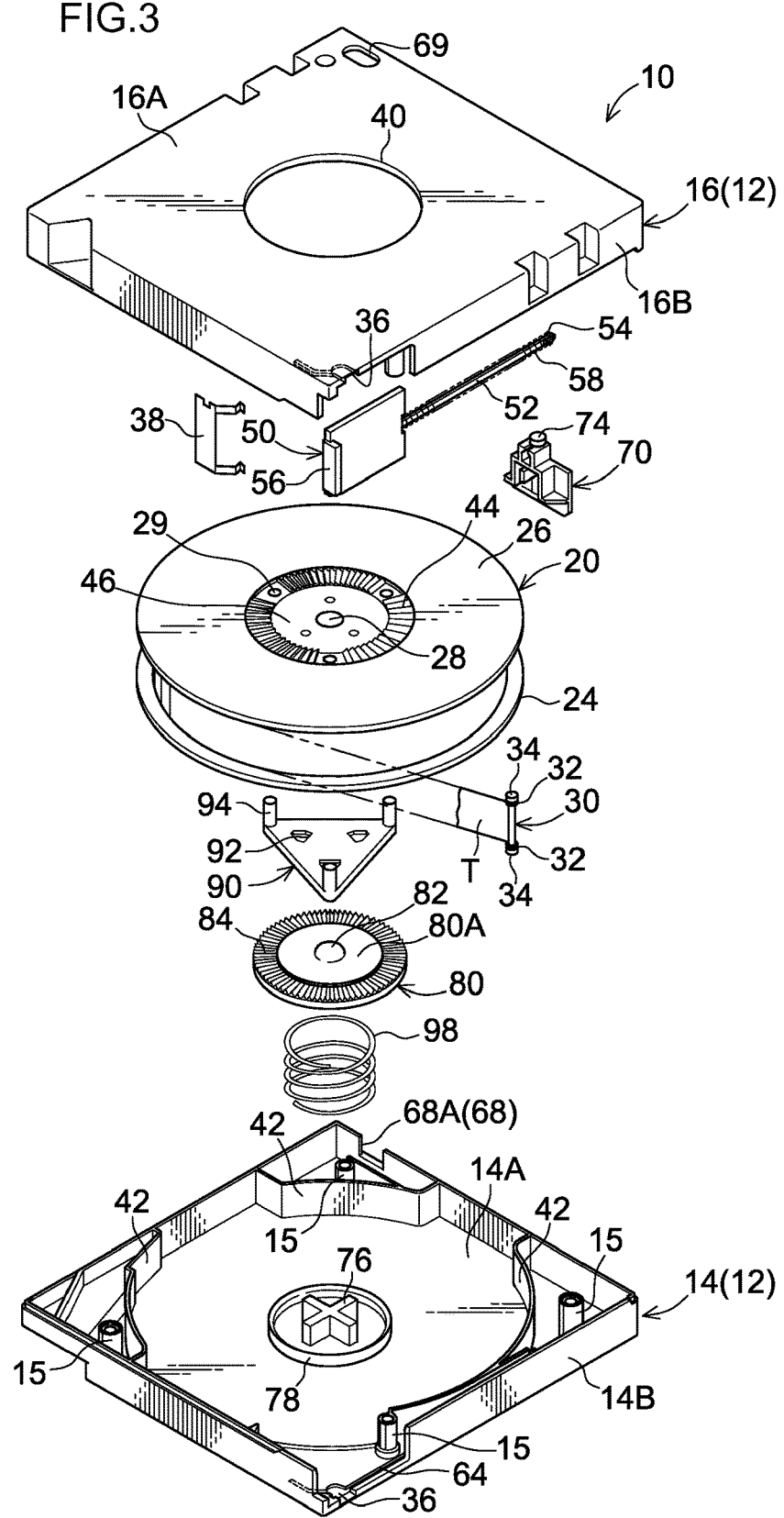
FIG. 3 is an exploded perspective view of a recording tape cartridge provided with a reel according to the present exemplary embodiment, as viewed from below.

As illustrated in FIG. 1 to FIG. 3, the recording tape cartridge 10 includes the substantially rectangular box shaped case 12. The case 12 is configured including an upper case 14 and a lower case 16 that are made from a resin, such as polycarbonate (PC), and is configured by joining a peripheral wall 14B that projects out from a peripheral edge of a top plate 14A, and a peripheral wall 16B that projects out from a peripheral edge of a bottom plate 16A, together in an abutting state using ultrasonic welding, screws, or the like.

Namely, for example, screw bosses 15 are formed in the vicinity of each corner portion of the upper case 14 and the lower case 16, such that the case 12 is assembled by screwing screws, not illustrated in the drawings, into the screw bosses 15 from the lower face side of the lower case 16. The single resin reel 20 is housed inside the case 12 so as to be rotatable.

The reel 20 is configured including a bottomed circular cylindrical hub 22 open at an upper edge side, a lower flange 26 integrally provided to the bottom end side of the hub 22, and a ring shaped upper flange 24 that is ultrasonically welded to the upper end side of the hub 22. A recording tape T such as a magnetic tape is wound as a data recording/reproduction medium onto the outer circumferential face of the hub 22 configuring the axial center portion of the reel 20. Both width direction end portions of the wound recording tape T are held (position limited) by the mutually facing upper flange 24 and lower flange 26.

Figure 4:
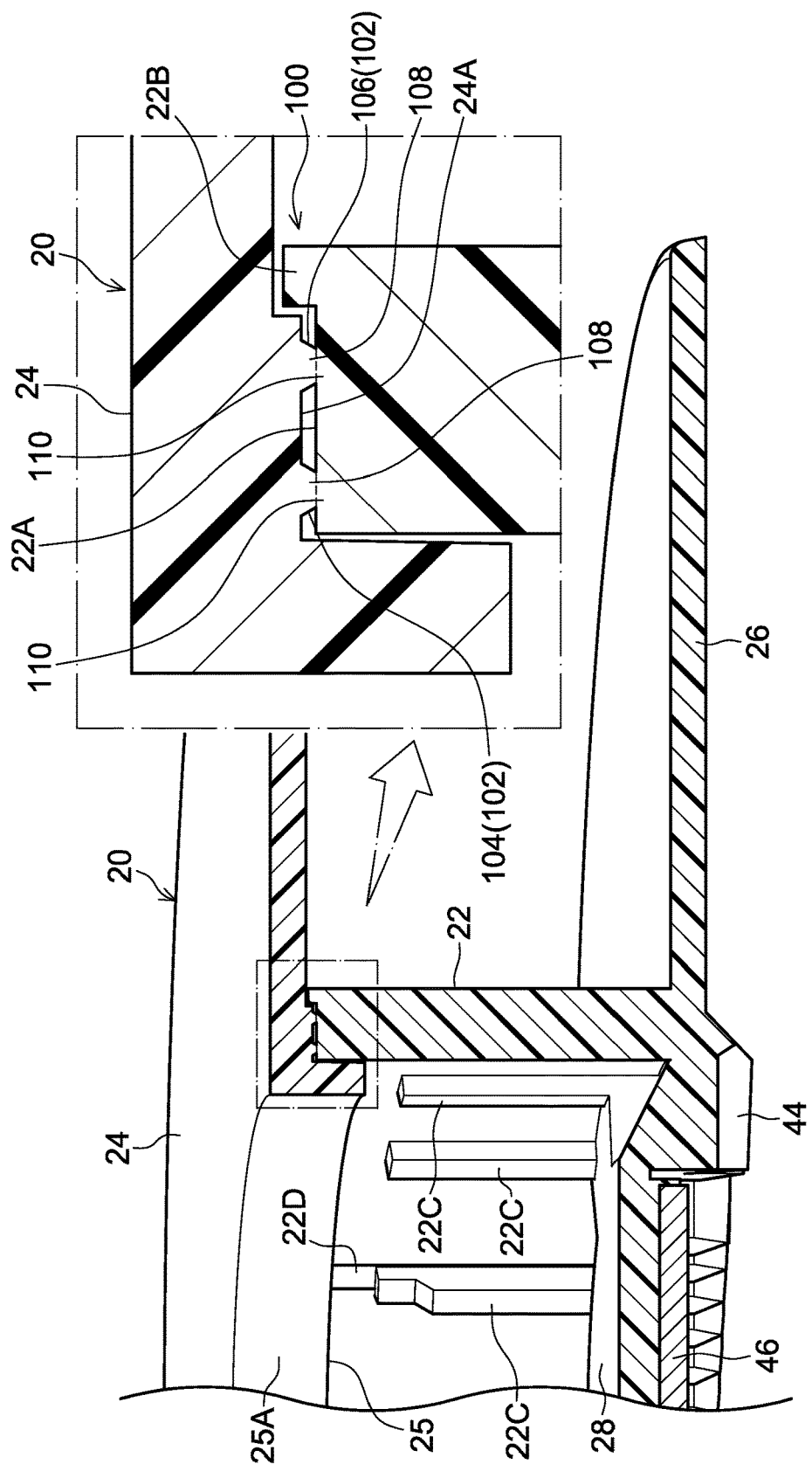
FIG. 4 is a perspective view illustrating a partial expanded cross-section of a welding structure of a reel according to the present exemplary embodiment.

As illustrated in FIG. 4, the bottomed circular cylindrical hub 22 referred to here is a hub having a single layer wall portion formed in a circular cylindrical shape. The ring shaped upper flange 24 is an upper flange including a hole 25A (short circular cylindrical portion 25), described below, corresponding to a circular cylindrical shaped hollow portion of the hub 22. A welding structure 100 of the hub 22 and the upper flange 24 is described in detail below.

A reel gear 44 is formed in a ring shape on the lower face (outside face) of a bottom wall (bottom portion) 28 of the hub 22. A gear opening 40 is formed through a substantially central portion of the lower case 16 in order to expose the reel gear 44 to the exterior. The reel 20 in the case 12 is rotatable relative to the case 12 by meshing the reel gear 44 exposed through the gear opening 40 with a drive gear (not illustrated in the drawings) formed to a rotation shaft (not illustrated in the drawings) of the drive device, and driving the rotation.

A reel plate 46 that is a ring shaped metal plate made from a magnetic material is coaxially and integrally fixed by insert molding to the lower face of the bottom wall 28 at the radial direction inside of the reel gear 44. The reel plate 46 is attracted to and held by the magnetic force of a ring shape magnet (not illustrated in the drawings) provided to the rotation shaft of the drive device. Moreover, the reel 20 is held so as not to rattle by play limiting walls 42 that project out intermittently from the respective inner faces of the upper case 14 and the lower case 16, and serve as inner walls tracing a circle coaxial to the gear opening 40.

An opening 18 is formed in the right wall of the case 12 for pulling out the recording tape T wound onto the reel 20. A leader pin 30 is fixed to the free end portion of the recording tape T pulled out from the opening 18, and serves as a leader member that is manipulated so as to be pulled out while being anchored by a pull out member (not illustrated in the drawings) of the drive device. Ring shape grooves 32 are formed on each end portion of the leader pin 30 that project out further than the width direction edge portions of the recording tape T, such that the ring shape grooves 32 are anchored by a hook or the like of the pull out member.

A pair of upper and lower pin retaining portions 36 for positioning and retaining the leader pin 30 are provided inside the case 12 at the inside of the opening 18 of the case 12, namely at the inside face of the top plate 14A of the upper case 14 and at the inside face of the bottom plate 16A of the lower case 16. The pin retaining portions 36 are substantially semi-circular shaped, opening toward the pull out side of the recording tape T, thereby enabling the two end portions 34 of the leader pin 30 to enter or exit the pin retaining portions 36 from the open side while the leader pin 30 is in an upright state.

A plate spring 38 is fixed in the vicinity of the pin retaining portions 36, and the leading end portions of a bifurcated plate spring 38 are engaged with the respective upper and lower two end portions 34 of the leader pin 30, so as to retain the leader pin 30 in the pin retaining portions 36. Configuration is made such that the leading end portions of the plate spring 38 suitably elastically deform to allow movement of the leader pin 30 when the leader pin 30 is entering or exiting the pin retaining portions 36.

The opening 18 is opened or closed by a door 50. The door 50 is formed in a substantially rectangular plate shape of a size capable of closing off the opening 18. In the top plate 14A and the bottom plate 16A at the inside of the opening 18, grooves 64, into which the upper and lower end portions of the door 50 are fitted, are formed to enable the door 50 to move along the right wall of the case 12.

A shaft 52 projects out from the center of the rear end portion of the door 50, and a coil spring 58 is inserted over the shaft 52. A widened portion 54 is formed at the rear end of the shaft 52 to prevent the coil spring 58 from coming off. A support ledge 60 projects out from the lower case 16 and includes an anchor portion 62 that anchors the rear end of the coil spring 58 inserted over the shaft 52.

The door 50 is accordingly configured so that the opening 18 is always biased in the closing direction by biasing force of the coil spring 58 due to the rear end of the coil spring 58 being anchored to the anchor portion 62 with the shaft 52 supported on the support ledge 60 so as to be capable of sliding. Preferably, a support ledge 66 is also provided projecting out at the rear side of the support ledge 60 to support the shaft 52 when the opening 18 is opened.

A protrusion 56 for use in opening and closing operation is providing projecting out toward the outside at a front end portion of the door 50. The protrusion 56 is engaged by an opening and closing member (not illustrated in the drawings) provided on the drive device side as the recording tape cartridge 10 is loaded into the drive device. The door 50 is thereby configured so as to open against the biasing force of the coil spring 58.

As illustrated in FIG. 2 and FIG. 3, at a left rear portion of the case 12, a write-protector 70 capable of sliding in the left-right direction is provided so as to set recording to the recording tape T as recordable/non-recordable. In the rear wall of the case 12, an opening 68 is formed to let an operation projection 72 project out, in order to operate the write-protector 70 with a finger. The opening 68 is configured so as to be formed by a cutout 68A formed in the peripheral wall 14B of the upper case 14 and a cutout 68B formed in the peripheral wall 16B of the lower case 16 when the upper case 14 and the lower case 16 have been joined.

An elongated hole 69 that is long in the left-right direction is also formed in the lower case 16 so as to expose a projection 74 of the write-protector 70. The position of the write-protector 70 is detected on the drive device side when the recording tape cartridge 10 is loaded into the drive device, so as to automatically determine whether recording to the recording tape T is recordable/non-recordable. The projection 74 does not project out from the lower face of the lower case 16.

Plural (for example, three) engaging gears 48 project out at specific intervals (even intervals, at 120 degree intervals for example) from an upper face at the peripheral edge of the bottom wall 28 of the hub 22. Plural (in this case three, at 120 degree intervals) through holes 29 are provided at specific positions on the reel gear 44 between the engaging gears 48.

A substantially circular plate shaped brake member 80 formed from resin is inserted into the hub 22. Namely, the circular cylindrical hollow space of the hub 22 is a space capable of housing a braking mechanism including the brake member 80. The hole 25A of the upper flange 24 is a hole through which the brake mechanism may pass or move.

A ring shaped brake gear 84 capable of meshing with the engaging gears 48 is formed to a peripheral edge of the lower face 80A of the brake member 80. An engaging projection 86 that is substantially cross shaped in plan view is provided projecting up from the upper face of the brake member 80. Rotation limiting ribs 76 that are substantially cross shaped in plan view and project out downward from the inner face of the top plate 14A of the upper case 14 are fitted into the engaging projection 86, and the engaging projection 86 projects out from the brake member 80 slightly higher than the height of the rotation limiting ribs 76. A configuration is thereby achieved in which the brake member 80 is non-rotatable with respect to the case 12 (the upper case 14), and is capable of moving in the up-down direction within the hub 22.

A compression coil spring 98 is disposed between the upper case 14 and the brake member 80. Namely, the compression coil spring 98 is disposed with one end abutting the inside of a ring shape projection 78 projecting from the outside of the rotation limiting ribs 76 of the upper case 14 (between the rotation limiting ribs 76 and the ring shape projection 78), and the other end of the compression coil spring 98 abutting the inside of a ring shaped groove 88 provided on the upper face of the brake member 80. The brake member 80 is continuously biased downward by biasing force of the compression coil spring 98.

Thus the recording tape cartridge 10 has a configuration in which the brake gear 84 is always in a meshed state with the engaging gears 48 when not in use (when not loaded into the drive device), in a rotation locked state in which relative rotation of the reel 20 with respect to the case 12 is prevented. The reel 20 is pressed against the lower case 16 side by this biasing force, such that the reel gear 44 is exposed from the gear opening 40.

Inside the hub 22, a release member 90 that is formed from resin in a substantially triangular shape in plan view is inserted below the brake member 80 (between the bottom wall 28 and the brake member 80). Plural (for example, three) through holes 92 are formed with a specific shape at appropriate locations in the release member 90 to achieve a reduction in weight of the release member 90. Legs 94 project out at each of the vertices on the lower face of the release member 90, so as to be inserted through the through holes 29, and project out from the lower face of the bottom wall 28 to a specific height above the reel gear 44.

A support protrusion 96 is formed with a flat plane shape at the center of the upper face of the release member 90, so as to abut a substantially semi-spherical shaped release projection 82 that projects out from the center of a lower face 80A of the brake member 80 (see FIG. 2, and FIG. 3). This thereby achieves a configuration in which the contact surface area between the brake member 80 and the release member 90 is reduced, thereby reducing the sliding resistance during use (during rotation of the reel 20). Polyacetal (POM) may, for example, be employed as the substance of the brake member 80, and polybutylene terephthalate (PBT) may, for example, be employed as the substance of the release member 90.

In the thus configured recording tape cartridge 10, detailed explanation follows regarding the welding structure 100 of the reel 20 according to the present exemplary embodiment. Reel configuration component parts according to the present exemplary embodiment include the hub 22 that is integrally formed with the lower flange 26, and the upper flange 24 prior to welding to the hub 22.

As illustrated in FIG. 4 to FIG. 7A, a short circular cylinder 25 is provided projecting out at the inner circumferential side (the inner circumferential edge) of the upper flange 24, so as to be inserted along the inner circumferential face at the inside of the hub 22. Namely, the outer diameter of the short circular cylinder 25 is substantially the same as the inner diameter of the hub 22. Plural (for example, six) indentations 25B that each have a substantially semi-circular arc shape as viewed from the bottom face are formed at even intervals along the circumferential direction on the outer circumferential face of the short circular cylinder 25 (see FIG. 5).

As illustrated in FIG. 4, plural restricting ribs 22C that each extend in the up-down direction are formed at even intervals along the circumferential direction on the inner circumferential face of the hub 22. The radial direction position of the brake member 80 is restricted from the outside by the restricting ribs 22C when the brake member 80 moves in the up-down direction inside the hub 22. Plural (for example, six) protrusions 22D that each extend in the up-down direction are formed separately to the restricting ribs 22C at the inner circumferential face of the hub 22 at even intervals in the circumferential direction. The protrusions 22D are substantially the same size as the indentations 25B and are formed with substantially semi-circular arc shapes in cross-section.

Thus the short circular cylinder 25 of the upper flange 24 is inserted at the inside of the hub 22 while each of the indentations 25B fits together with each of the protrusions 22D. This thereby achieves a configuration in which the upper flange 24 is stopped from rotating (fixed in position at a circumferential direction position) with respect to the hub 22, in a configuration in which there are restricting ribs 22C disposed at positions corresponding to at least some of the positions where there is a single welding rib 102, described below, present in the radial direction.

Figure 5:
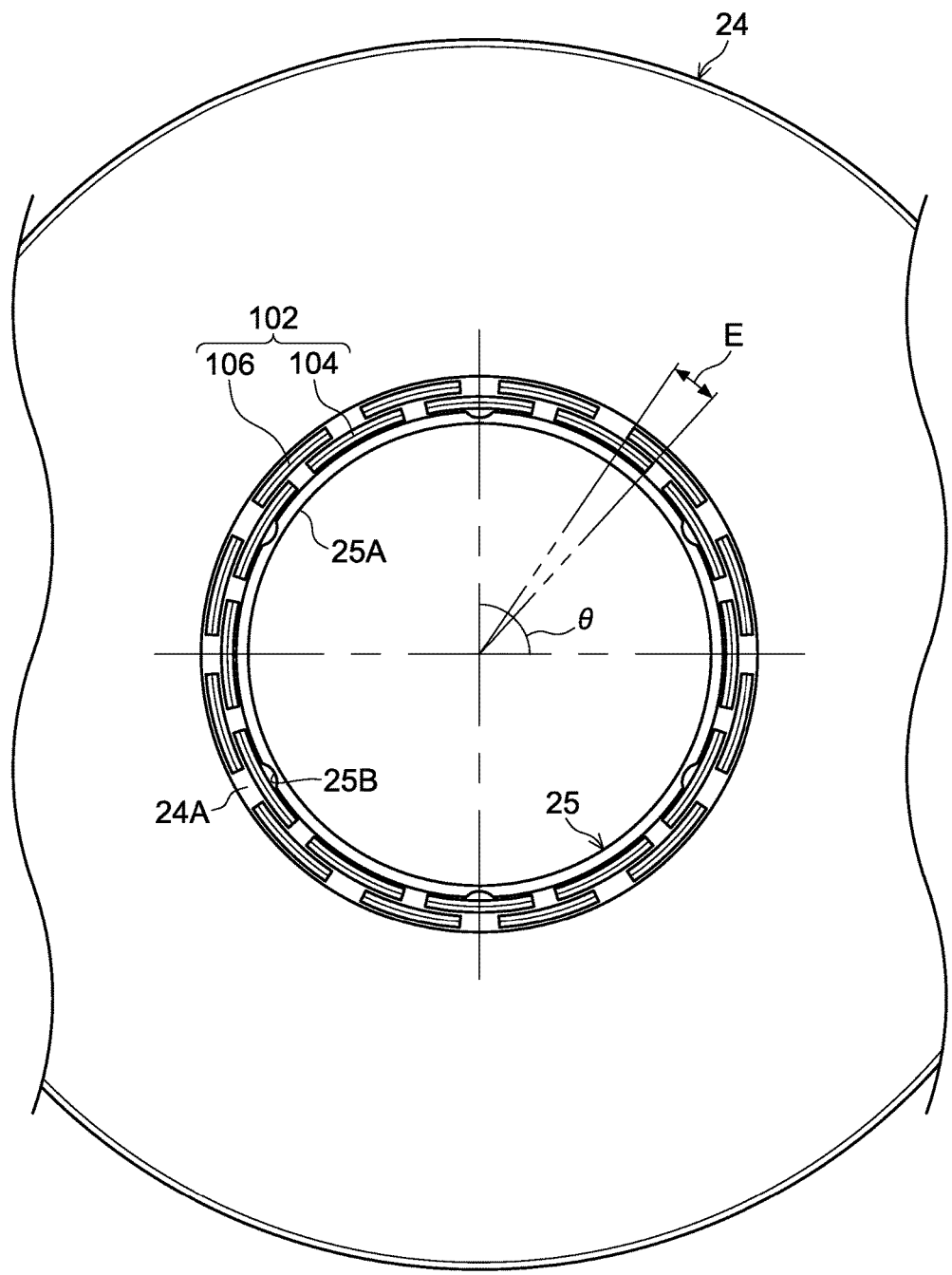
FIG. 5 is a bottom face view illustrating welding ribs formed to an upper flange of a reel according to the present exemplary embodiment.

Moreover, as illustrated in FIG. 4 to FIG. 7A, a configuration is achieved in which welding ribs 102 are integrally formed to a lower face 24A of the upper flange 24 at the radial direction outside of the short circular cylinder 25, for welding (joining) to an upper end face 22A of the hub 22. The welding ribs 102 according to the present exemplary embodiment are disposed such at least one region E where, as illustrated in FIG. 5, plural of the welding ribs 102 are present (for example 2 rows) side-by-side in the radial direction is disposed within any selected range of the hub 22 (the short circular cylinder 25) having an imaginary central angle θ of 90 degrees as viewed from the bottom face (in plan view).

More specifically, the welding ribs 102 are configured by inside ribs 104 and outside ribs 106, with plural of the inside ribs 104 and the outside ribs 106 formed intermittently around the entire circumference. The inside ribs 104 and the outside ribs 106 are disposed such that there is at least one rib present at every position around the circumferential direction. Namely, at least a portion (the two end portions) of the inside ribs 104 and the outside ribs 106 that are adjacent to each other in the radial direction, include portions that overlap with each other along the circumferential direction, and these overlapping portions are the regions E.

Moreover, as illustrated in FIG. 4, weld portions 108 (melt locations) are formed by melting the welding ribs 102 (the inside ribs 104 and the outside ribs 106) formed to the lower face 24A of the upper flange 24 using ultrasonic vibration energy. Moreover, at the weld portions 108, there are weld affected portions 110 formed on the upper end face 22A of the hub 22 (on the side of the face not formed with the welding ribs 102).

The weld affected portions 110 exhibit visible streaks of welding marks when the upper flange 24 is removed from the hub 22 and remaining melted resin is shaved away from the upper end face 22A of the hub 22. Obviously, the weld affected portions 110 are also disposed at the same locations in plan view as the welding ribs 102 (the inside ribs 104 and the outside ribs 106) prior to welding.

The weld affected portions 110 may be understood to be locations affected by welding that are locations of the hub 22 that face toward the weld portions 108, or are locations where material of the upper flange 24 is internally affected by welding (internal portions where the welding ribs 102 were not originally present). The weld affected portions 110 are mainly formed at portions abutting the leading end portions of the welding ribs 102, and so may be understood to be locations that face toward the welding ribs 102 during welding.

Moreover, as illustrated in FIG. 4, a ring shaped projection 22B is formed at the radial direction outside of the upper end face 22A of the hub 22 to suppress or prevent the melted welding ribs 102 (and in particular the outside ribs 106) from flowing onto the outer circumferential face of the hub 22. Thus the upper end face 22A of the hub 22 where the weld affected portions 110 are formed is at the upper end side of the hub 22, and is not necessarily the leading end face.

Namely, in the case of the reel 20 according to the present exemplary embodiment, since the welding ribs 102 are not formed to the upper end face (the leading end face) of the projection 22B, the upper end face 22A of the hub 22 does not include the upper end face (the leading end face) of the projection 22B. The reel configuration component parts according to the present exemplary embodiment also include a hub 22 not formed with the projection 22B of the upper end face 22A.

Figure 7A:
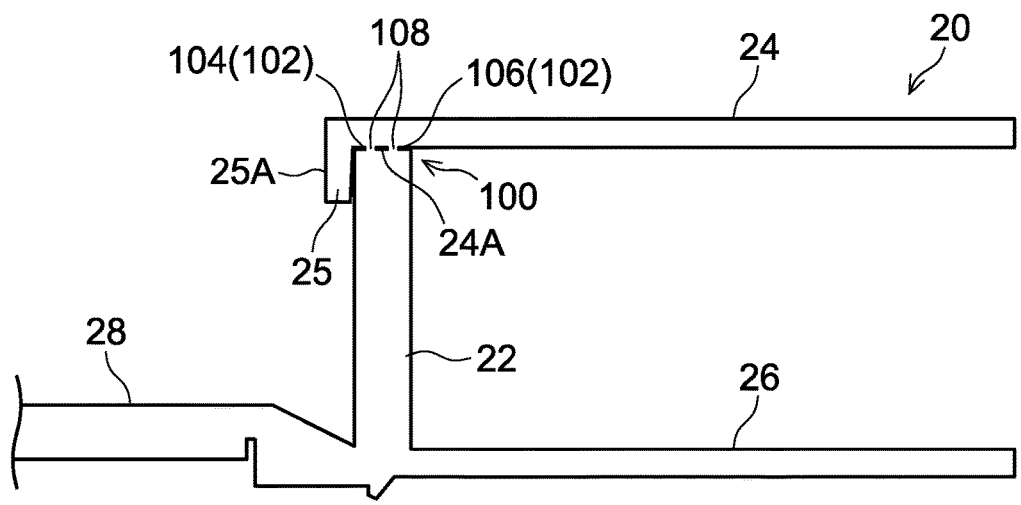
FIG. 7A is a cross-section illustrating a welding structure prior to winding recording tape onto a reel according to the present exemplary embodiment.
Figure 7B:
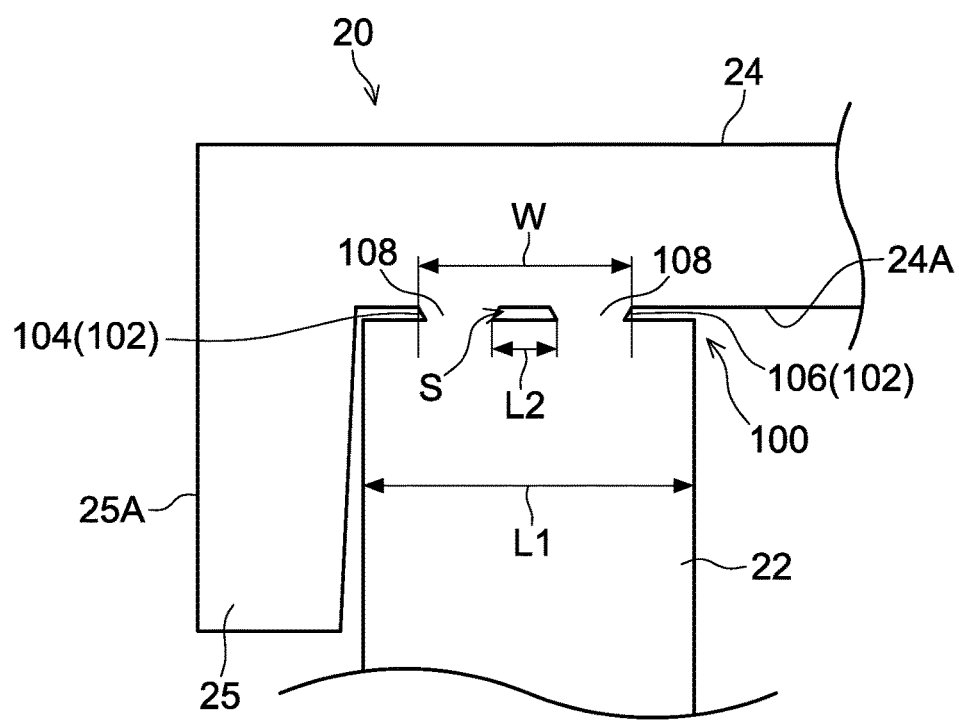
FIG. 7B is an expanded cross-section of a portion of FIG. 7A.

Moreover, as illustrated in FIG. 7B, at the welding ribs 102 (the weld portions 108) disposed in the regions E after welding, a length (width) W along the radial direction from the radial direction inside end portion of the inside ribs 104 (the end faces thereof on the upper end face 22A side) to the radial direction outside end portion of the outside ribs 106 (the end faces thereof on the upper end face 22A side) is a length of 50% of a thickness L1 of the hub 22, or greater. The length (width) W may also be calculated from a position along the radial direction at the respective bases of the inside ribs 104 and the outside ribs 106 before welding.

The length W is a length that includes a length L2 along the radial direction of a gap S between the inside rib 104 and the outside rib 106, and the length L2 of the gap S is, for example, substantially the same length as the length (width) along the radial direction of the inside ribs 104 and the outside ribs 106 after welding. In cases in which the thickness L1 of the hub 22 is not uniform along the axial direction, the thickness L1 may be taken as the governing thickness dimension at the upper end portion side of the hub 22.

Explanation next follows regarding operation of the welding structure 100 of the thus configured reel 20 (reel configuration component parts).

Figure 11A:
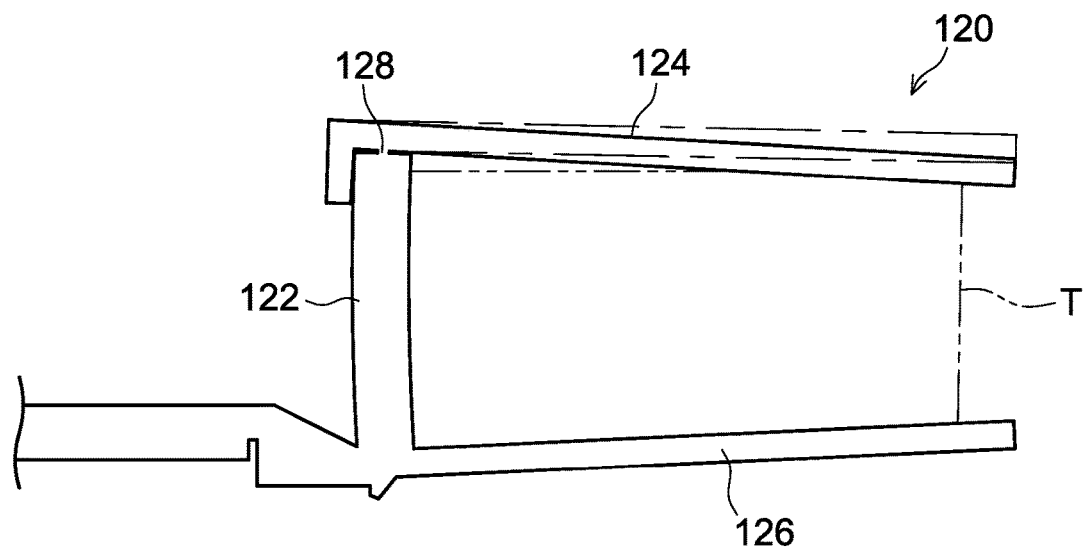
FIG. 11A is a cross-section illustrating a welding structure after winding recording tape onto a reel according to a Comparative Example.
Figure 11B:
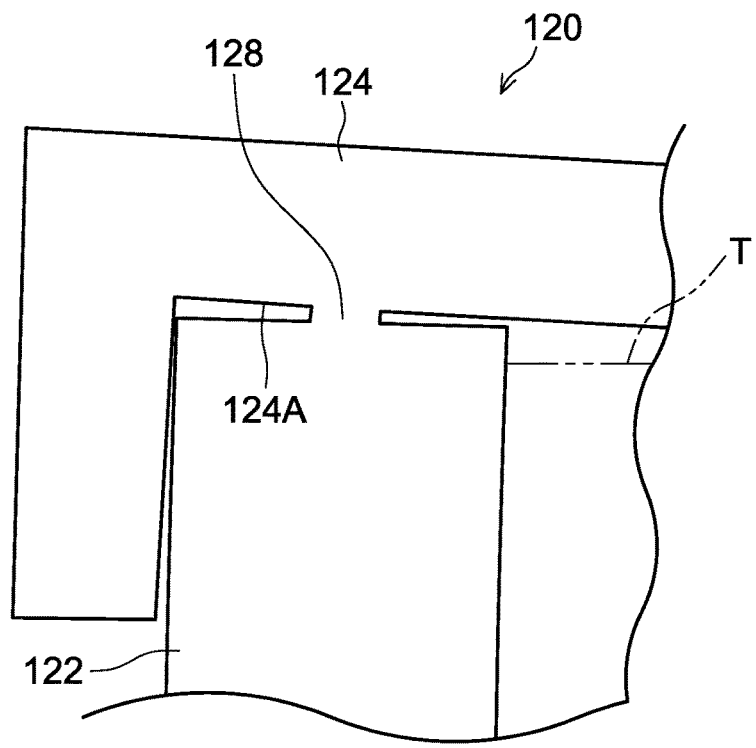
FIG. 11B is a cross-section illustrating an expanded portion of FIG. 11A.

Explanation first follows regarding a reel 120 according to a Comparative Example in which a welding rib 128 is continuously formed as a single rib around the entire circumference of a lower face 124A of an upper flange 124. As illustrated in FIG. 11A, 11B, when a recording tape T has been wound on a hub 122 of the reel 120 according to the Comparative Example, the force of winding of the recording tape T deforms the upper end portion side of the hub 122 so as to tilt toward the radial direction outside.

When this occurs, the welding rib 128 (weld portion) acts as a deformation fulcrum, and the outer circumferential side of the upper flange 124 deforms by the amount of deformation of the hub 122 or greater so as to approach a lower flange 126 side. Namely, although deformation of the upper flange 124 caused by following the deformation of the hub 122 is only as far as the position indicated by the single dashed line in FIG. 11A, in reality the deformation is this deformation or greater.

Figure 10A:
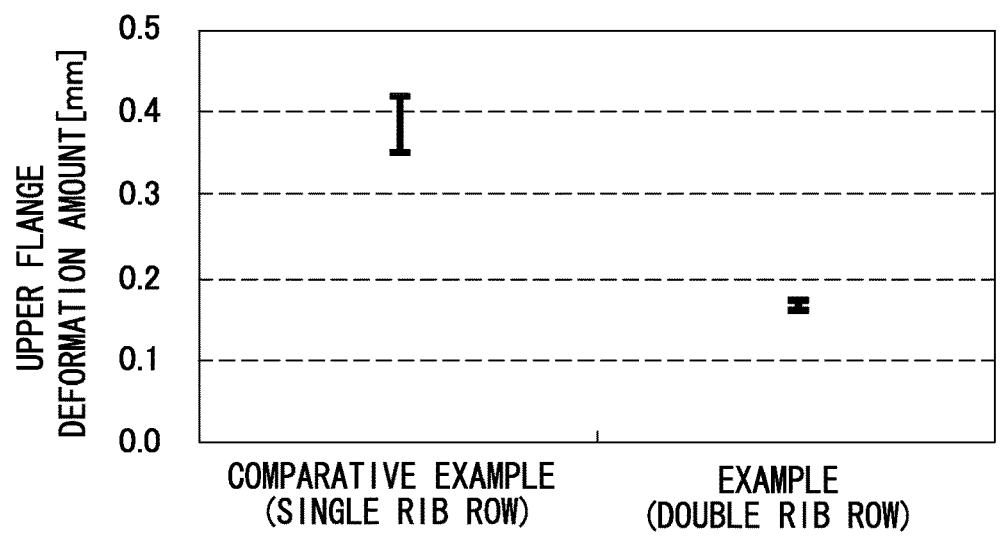
FIG. 10A is graph illustrating a deformation amount of an upper flange of a reel according to the present exemplary embodiment and of a reel according to a Comparative Example (with single welding rib row)
Figure 10B:
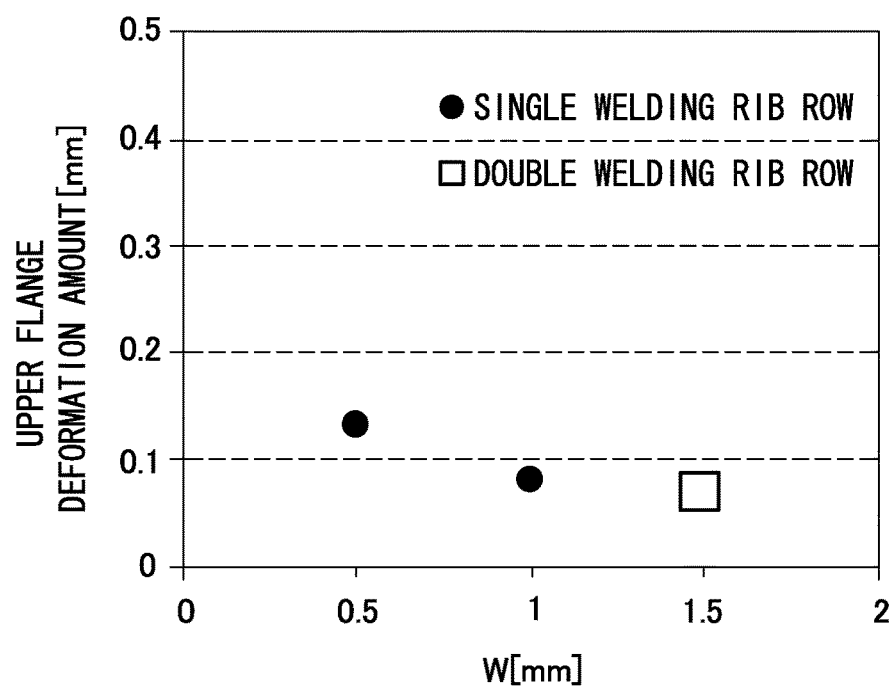
FIG. 10B is graph illustrating a deformation amount of an upper flange of a reel according to the present exemplary embodiment and of a reel according to a Comparative Example (with small width of welding rib)

Specific deformation amounts at the outer circumferential portion side of the upper flange 124 are illustrated in the graphs of FIGS. 10A, 10B. Three samples of the reel 120 according to the Comparative Example were prepared, and the deformation amount of the outer circumferential portion side of each of the upper flanges 124, and the plotted range of the deformation amounts is illustrated at the left hand side of FIG. 10A. FIG. 10B illustrates a plot for cases in which the width (length along the radial direction) W of the welding rib 128 in the reel 120 according to the Comparative Example is 0.5 mm or 1.0 mm, each indicated by a black circle.

Note that the deformation amount shown in FIG. 10A is measured using a three dimensional coordinate measuring machine "Crysta" of Mitsutoyo which is numerically computer-controlled. Furthermore, the deformation amount shown in FIG. 10B is based on a simulation result using an analysis software "ABAQUS", where a model in which a magnetic tape T has been wound on the hub 122 of the reel 120 according to the Comparative Example is created and the deformation amount of the upper flange 124 is set to a node movement amount at the outermost circumference of the upper flange 124 after winding.

However, the reel 20 according to the present exemplary embodiment has the configuration described above. Namely, locations where the lower face 24A of the upper flange 24 and the upper end face 22A of the hub 22 are welded together (the weld portions 10) at plural points (for example 2 points) in the radial direction are formed along the radial direction (with plural such locations formed around the entire circumference). This thereby suppresses or prevents the welding ribs 102 (the weld portions 108) from becoming the origin of deformation of the upper flange 24, and suppresses or prevents the outer circumferential portion side of the upper flange 24 from tilting so as to approach the lower flange 26 side.

Figure 8A:
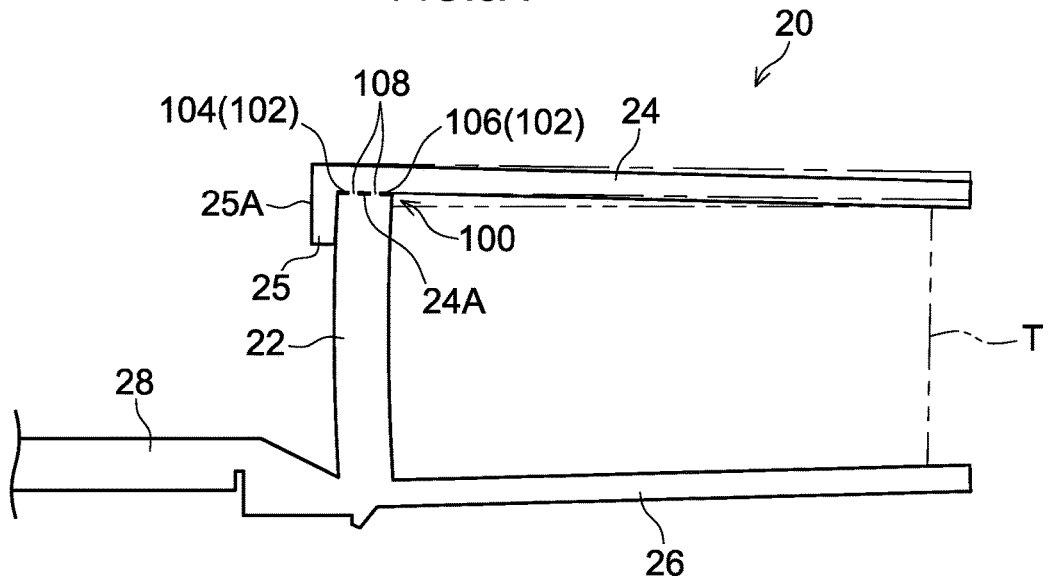
FIG. 8A is a cross-section illustrating a welding structure after winding recording tape onto a reel according to the present exemplary embodiment.
Figure 8B:
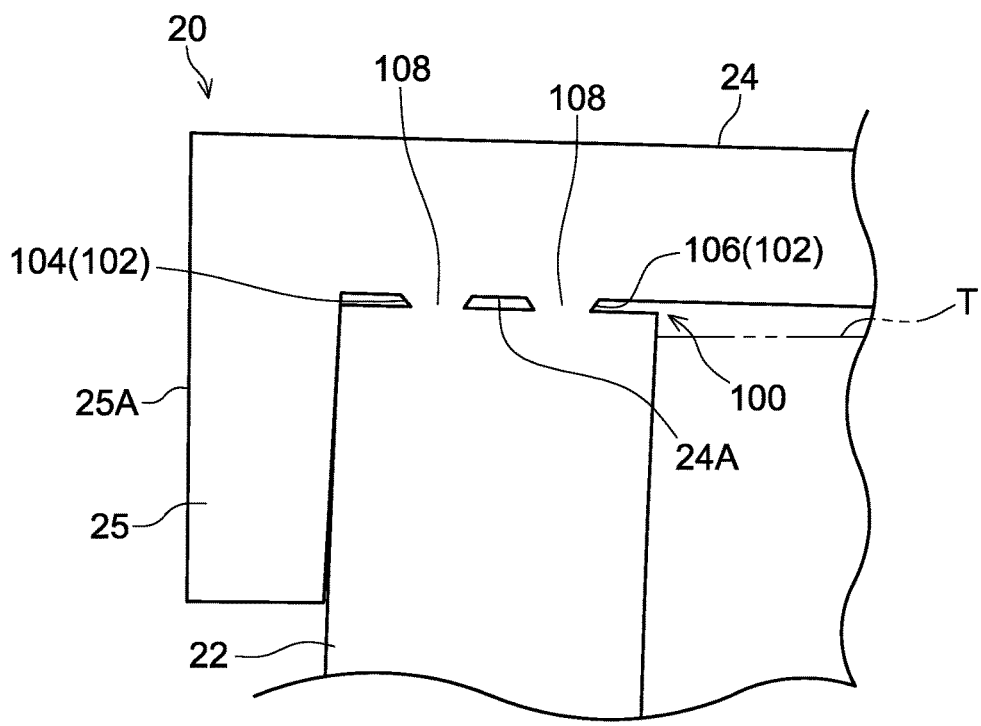
FIG. 8B is an expanded cross-section of a portion of FIG. 8A.

Thus, as illustrated in FIGS. 8A, 8B, when the recording tape T is wound on the hub 22 of the reel 20 according to the present exemplary embodiment, even if the upper end portion side of the hub 22 tilts toward the radial direction outside due to the force of winding the recording tape T, deformation of the upper flange 24 by the deformation of the hub 22 or greater can be suppressed.

Namely, although deformation of the upper flange 24 caused by following the deformation of the hub 22 occurs only as far as the position indicated by the single dashed line in FIG. 8A, in reality the deformation is this amount or greater. However, this amount of deformation is reduced more than in the reel 120 according to the Comparative Example illustrated in FIGS. 11A, 11B.

Specific deformation amounts at the outer circumferential portion side of the upper flange 24 are illustrated in the graphs of FIGS. 10A, 10B, together with those of the Comparative Example. Three samples of the reel 20 according to the present exemplary embodiment were prepared, and the plotted range of the deformation amounts at the outer circumferential portion sides of each of the upper flanges 24 are illustrated at the right hand side of FIG. 10A. FIG. 10B indicates a plot for a case in which the width (length along the radial direction) W of the welding rib 102 in the reel 20 according to the present exemplary embodiment is 1.5 mm, indicated by a white square.

Note that, as mentioned above, the deformation amount shown in FIG. 10B is based on a simulation result using an analysis software "ABAQUS", where a model in which a magnetic tape T has been wound on the hub 22 of the reel 20 according to the present embodiment is created and the deformation amount of the upper flange 24 is set to a node movement amount at the outermost circumference of the upper flange 24 after winding.

As is apparent from each of the graphs, the deformation amount at the outer circumferential portion side of the upper flange 24 is reduced in the reel 20 according to the present exemplary embodiment compared to in the reel 120 according to the Comparative Example. Thus the reel 20 (the reel configuration component parts) according to the present exemplary embodiment enables the deformation amount of the upper flange 24 to be reduced to deforming by as much as the deformation amount of the hub 22 arising from the force of winding the recording tape T or greater.

Moreover, the welding ribs 102 are disposed such that there is at least one welding rib present at every position around the circumferential direction. Namely, the welding ribs 102 are configured by the inside ribs 104 and the outside ribs 106 such that there is no gap in the circumferential direction. Thus in comparison to configurations in which there is a gap in the circumferential direction, the weld strength brake gear 84 arising from the welding ribs 102 can be raised when the lower face 24A of the upper flange 24 and the upper end face 22A of the hub 22 are welded (joined) together. This thereby enables the deformation amount of the upper flange 24 to be reduced even further to deforming by as much as the amount of the deformation of the hub 22 arising from the force of winding the recording tape T or greater.

Moreover, the number of rows of the welding ribs 102 disposed at the regions E is two rows in the radial direction. Namely, the welding ribs 102 are configured from only the inside ribs 104 and the outside ribs 106. Thus a smaller amount of ultrasonic vibration energy suffices to weld the welding ribs 102 (the inside ribs 104 and the outside ribs 106) than in configurations in which the number of rows of the welding ribs 102 disposed at the regions E is three rows or more in the radial direction. This thereby enables the productivity of the reel 20 to be increased.

Moreover, the position of the upper flange 24 in the circumferential direction with respect to the hub 22 is determined by the protrusions 22D and the indentations 25B, with the restricting ribs 22C disposed so as to correspond to at least some of the locations where there is a single welding rib 102 present in the radial direction. The upper end portion side of the hub 22 therefore does not readily tilt toward the radial direction outside at the locations where the restricting ribs 22C are formed. This thereby enables the upper end portion side of the hub 22 to be suppressed from deforming so as to tilt toward the radial direction outside even at locations where the welding ribs 102 are a single rib in the radial direction.

Figure 6:
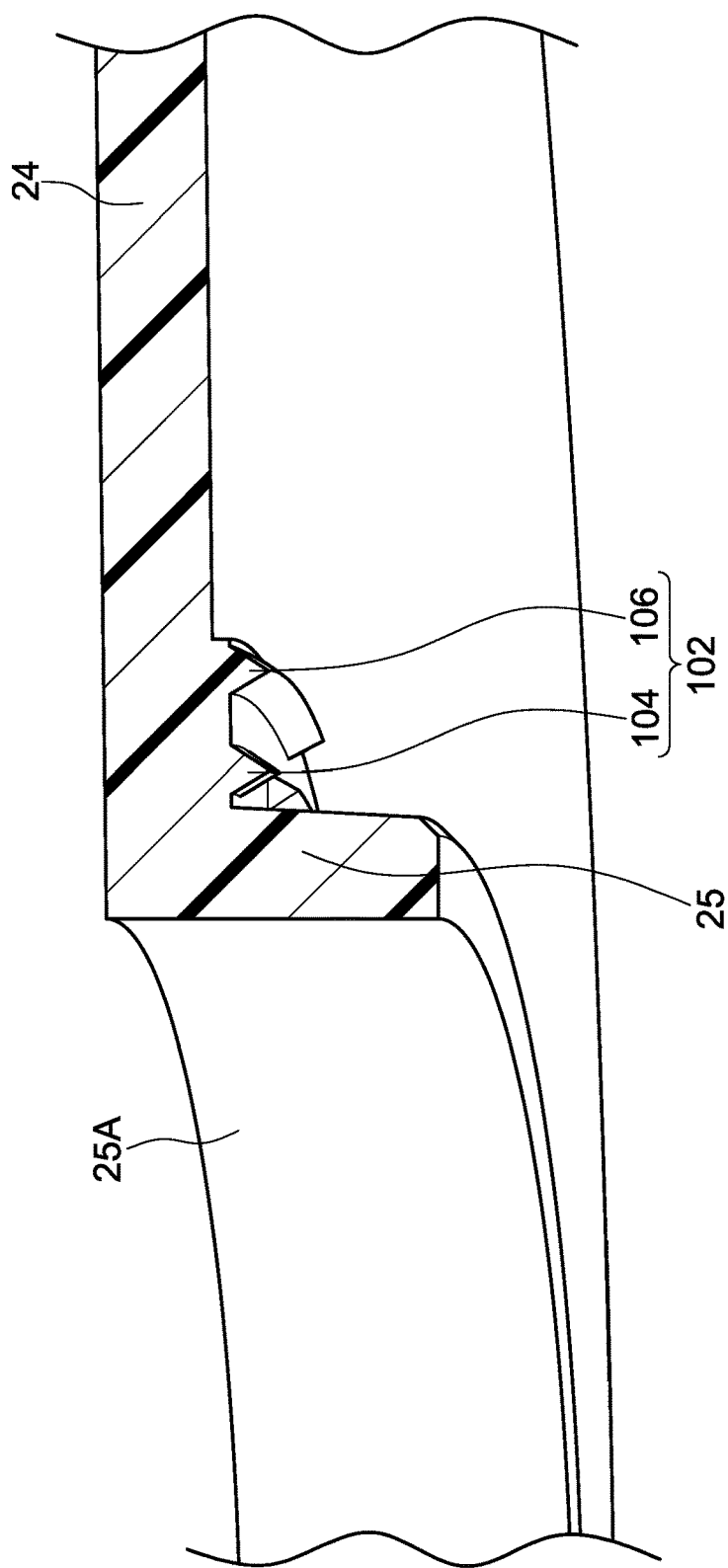
FIG. 6 is a perspective view illustrating a welding rib formed to an upper flange of a reel according to the present exemplary embodiment.
Figure 9A:
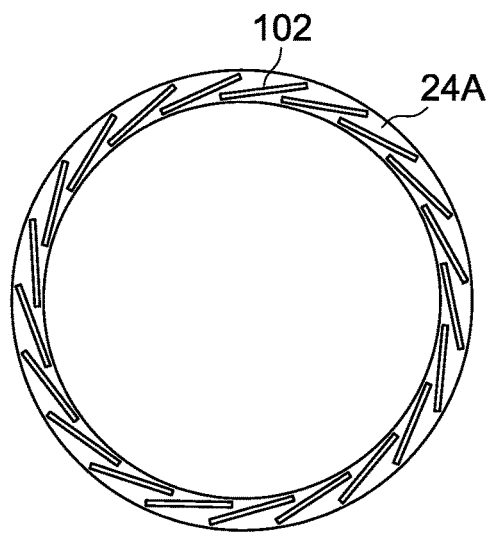
FIG. 9A is a bottom face view illustrating a modified example of welding ribs formed to an upper flange of a reel according to the present exemplary embodiment.
Figure 9B:
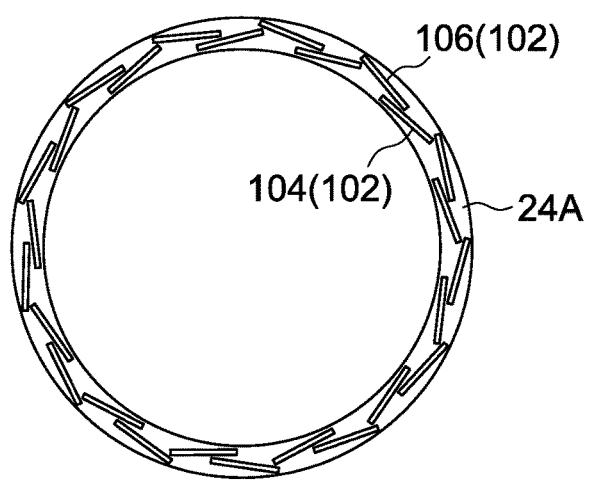
FIG. 9B is a bottom face view illustrating a modified example of welding ribs formed to an upper flange of a reel according to the present exemplary embodiment.
Figure 9C:
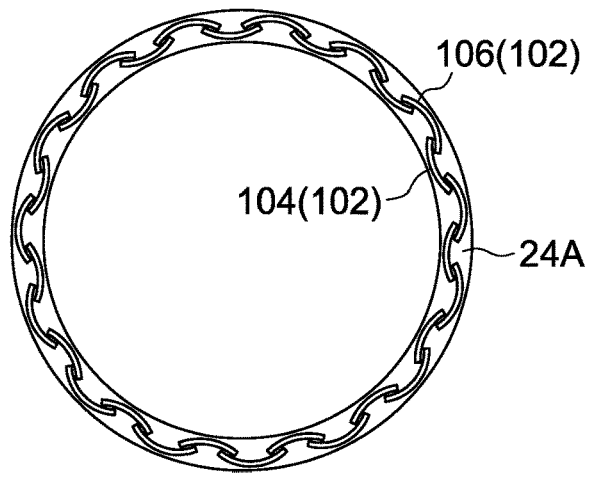
FIG. 9C is a bottom face view illustrating a modified example of welding ribs formed to an upper flange of a reel according to the present exemplary embodiment.

The shape of the welding ribs 102 according to the present exemplary embodiment are not limited to the shapes illustrated in FIG. 5 and FIG. 6. For example, as illustrated in FIG. 9A, each of the welding ribs 102 may be formed in a shape angled with respect to the circumferential direction as viewed from the bottom face (plan view). The inside ribs 104 and the outside ribs 106 may also, for example, as illustrated in FIG. 9B, be formed in shapes that are each angled at different angles with respect to the circumferential direction as viewed from the bottom face (plan view). Moreover, the inside ribs 104 and the outside ribs 106 may, for example as illustrated in FIG. 9C, be formed with circular arc shapes with respective curved faces (convex faces) facing toward the radial direction inside and the radial direction outside as viewed from the bottom face (plan view).

Explanation has been given regarding the reel 20 (reel configuration component parts) according to the present exemplary embodiment with reference to the drawings, however the reel 20 (reel configuration component parts) according to the present exemplary embodiment is not limited by the drawings, and appropriate design changes are possible within a range not departing from the spirit of the present invention.

For example, the welding ribs 102 may be integrally formed to the upper end face 22A of the hub 22 rather than to the lower face 24A of the upper flange 24, or the welding ribs 102 may be formed to both the lower face 24A of the upper flange 24 and the upper end face 22A of the hub 22. Namely, configuration may, for example, be made such that the inside ribs 104 are formed to the lower face 24A of the upper flange 24, and the outside ribs 106 are formed to the upper end face 22A of the hub 22.

Moreover, the welding ribs 102 are not limited to a configuration in which there are two rows of the inside ribs 104 and the outside ribs 106 formed in the radial direction, and may be formed with three or more rows in the radial direction. Moreover, although it is preferable for the length (width) W, along the radial direction from the radial direction inside end portion of the inside ribs 104 formed at the innermost side in the radial direction to the radial direction outside end portion of the outside ribs 106 formed at the outmost side in the radial direction, to be a length of 50% of the thickness of the hub 22 or greater for the welding ribs 102 disposed in the regions E, the length W may be less than 50% thereof.

Moreover, there is no limitation to a configuration in which the welding ribs 102 (the inside ribs 104 and the outside ribs 106) are disposed such there is at least one rib present at each position in the circumferential direction. Thus a configuration may be adopted in which at least a portion of the adjacent welding ribs 102 in the radial direction (the inside ribs 104 and the outside ribs 106) do not have an overlapping portion along the circumferential direction.

Moreover, there is no limitation to a configuration in which the welding ribs 102 (the inside ribs 104 and the outside ribs 106) are respectively formed intermittently around the entire circumference, and they may, for example, be formed (in a ring shape) continuously around the entire circumference. There is, moreover, no limitation to a configuration in which locations of the welding ribs 102 where there is a single rib in the radial direction are disposed so as to correspond to the restricting ribs 22C.

According to a first aspect of the present invention, the weld portion is disposed such that there is at least a region present where there are plural of the weld portions side-by-side in the radial direction within any selected range of the hub having a central angle of 90 degrees in plan view. Namely, locations where the lower face of the upper flange and the upper end face of the hub are welded at plural points in the radial direction are formed along the circumferential direction. This thereby suppresses the weld portion from acting as a fulcrum for deformation, and the outer circumferential portion side of the upper flange from tilting so as to approach the lower flange side. Thus the deformation of the upper flange, deforming by as much as the deformation of the hub arising from force of winding the recording tape or greater, to be suppressed. Moreover, variation in the deformation amount of the upper flange along the circumferential direction is suppressed from arising due to the selected range being 90 degrees.

A reel of a second aspect according to the present invention is the reel of the first aspect, wherein the weld portion is disposed such that there is at least one weld portion present at every position around the circumferential direction.

According to the second aspect of the invention, there is at least one weld portion present at every position around the circumferential direction. Namely, weld portions where the lower face of the upper flange and the upper end face of the hub are joined do not have gaps around the circumferential direction, raising the weld strength. Thus deformation of the upper flange, deforming by as much as the deformation of the hub arising from the force of winding the recording tape or greater, is suppressed.

A reel of a third aspect according to the present invention is the reel of the first aspect or the second aspect, wherein the position of the weld portion is defined as being a weld affected portion where the hub faces toward the weld portion, or where material of the upper flange is internally affected by welding.

According to the fourth aspect of the present invention, the welding rib formed to at least one out of the lower face of the upper flange or the upper end face of the hub is disposed such that there is at least a region present where there are plural of the welding ribs side-by-side in the radial direction within any selected range of the hub having a central angle of 90 degrees in plan view. Namely, locations where the lower face of the upper flange and the upper end face of the hub are welded at plural points in the radial direction are formed along the circumferential direction. This thereby suppresses the welding rib from acting as a fulcrum for deformation of the upper flange, and the outer circumferential portion side of the upper flange from tilting so as to approach the lower flange side. Thus the deformation of the upper flange, deforming by as much as the deformation of the hub arising from force of winding the recording tape or greater, is suppressed. Moreover, variation in the deformation amount of the upper flange along the circumferential direction is suppressed from arising due to the selected range being 90 degrees.

Reel configuration component parts of a fifth aspect according to the present invention are the reel configuration component parts of the fourth aspect, wherein the welding rib is disposed such that there is at least one welding rib present at every position around the circumferential direction.

According to the fifth aspect of the present invention, the welding rib is disposed such that there is at least one welding rib present at every position around the circumferential direction. Namely, the welding ribs where the lower face of the upper flange and the upper end face of the hub are welded do not have gaps around the circumferential direction, with the weld strength raised by the welding ribs. Thus deformation of the upper flange, deforming by as much as the deformation of the hub arising from the force of winding the recording tape or greater, is suppressed.

Reel configuration component parts of a sixth aspect of the present invention are the reel configuration component parts of the fourth aspect or the fifth aspect, wherein the welding rib is formed intermittently around the entire circumference, and there is a portion present where at least a portion of the welding ribs adjacent in the radial direction overlap in the circumferential direction.

According to the sixth aspect of the present invention, the welding rib is formed intermittently around the entire circumference, and there is a portion present where at least a portion of the welding ribs adjacent in the radial direction overlap in the circumferential direction. Namely, locations where the lower face of the upper flange and the upper end face of the hub are welded at plural points in the radial direction are formed along the circumferential direction. This thereby suppresses or prevents the welding rib from acting as a fulcrum for deformation of the upper flange, and the outer circumferential portion side of the upper flange from tilting so as to approach the lower flange side. Thus the deformation of the upper flange, deforming by as much as the deformation of the hub arising from force of winding the recording tape or greater, is suppressed.

Reel configuration component parts of a seventh aspect of the present invention are the reel configuration component parts of the fourth aspect to the sixth aspect, wherein the number of rows of the welding ribs disposed in the above-mentioned region is two rows in the radial direction.

According to the seventh aspect of the present invention, the number of rows of the welding ribs disposed in the above-mentioned region is two rows in the radial direction. Thus a smaller amount of ultrasonic vibration energy suffices to weld the welding ribs than in configurations in which the number of rows of the welding ribs disposed in the above-mentioned region is three rows or more in the radial direction. This thereby enables the productivity of the reel to be increased.

Reel configuration component parts of the eighth aspect of the present invention are the reel configuration component parts of the fourth aspect to the seventh aspect, wherein from out of the welding ribs disposed in the above-mentioned region, a length along the radial direction from a radial direction inside end portion of the welding rib formed at the radial direction innermost side to the radial direction outside end portion of the welding rib formed at the radial direction outermost side is 50% of the thickness of the hub, or greater.

According to the eighth aspect of the present invention, from out of the welding ribs disposed in the above-mentioned region, the length along the radial direction from the radial direction inside end portion of the welding rib formed at the radial direction innermost side to the radial direction outside end portion of the welding rib formed at the radial direction outermost side is 50% of the thickness of the hub, or greater. This thereby suppresses or prevents the welding rib from acting as a fulcrum for deformation of the upper flange, and the outer circumferential portion side of the upper flange from tilting so as to approach the lower flange side, and increases the welding strength of the welding rib. Thus the deformation of the upper flange, deforming by as much as the deformation of the hub arising from force of winding the recording tape or greater, is suppressed.

As described above, the present invention enables the deformation of the upper flange, deforming by as much as the deformation of the hub arising from force of winding the recording tape or greater, to be suppressed.

What is claimed is:

1. A reel comprising:
   a hub that is formed from a resin and that has a bottomed circular cylindrical shape open at an upper end portion side;
   a lower flange that is provided at a lower end portion side of the hub and is integrally formed with the hub;
   a ring shaped upper flange that faces toward the lower flange; and
   a plurality of weld portions at a position where a lower face of the upper flange is joined to an upper end face of the hub,
   wherein, as viewed from the lower face of the upper flange in plan view, the plurality of weld portions are formed at intervals along an entire circumference of the reel and are disposed side-by-side in a radial direction of the hub overlapping with each other along the circumferential direction such that there is at least one weld portion present at every position along a circumference of the lower face of the upper flange.

2. The reel of claim 1, wherein the position of each weld portion is a weld affected portion where the hub faces toward the weld portion, or where material of the upper flange is internally affected by welding.

3. Reel configuration component parts comprising:
   a hub that is formed from a resin and that has a bottomed circular cylindrical shape open at an upper end portion side;
   a lower flange that is integrally formed with the hub at a lower end portion side of the hub;
   a ring shaped upper flange that is to be provided facing toward the lower flange at an upper end portion side of the hub; and
   a plurality of welding ribs for welding a lower face of the upper flange to an upper end face of the hub,
   wherein the plurality of welding ribs are formed at at least one out of the lower face of the upper flange or the upper end face of the hub, and as viewed from the lower face of the upper flange in plan view, the plurality of the welding ribs are formed at intervals along an entire circumference of the reel and are disposed side-by-side in a radial direction of the hub overlapping with each other along the circumferential direction such that there is at least one weld portion present at every position along a circumference of the lower face of the upper flange.

4. The reel configuration component parts of claim 3, wherein:
   welding ribs are formed intermittently around the entire circumference; and
   at least a portion of the welding ribs adjacent in the radial direction overlap in the circumferential direction.

5. The reel configuration component parts of claim 4, wherein:
   welding ribs are formed intermittently around the entire circumference; and
   at least a portion of the welding ribs adjacent in the radial direction overlap in the circumferential direction.

6. The reel configuration component parts of claim 3, wherein
   two rows of welding ribs are disposed in the radial direction.

7. The reel configuration component parts of claim 4, wherein
   two rows of welding ribs are disposed in the radial direction.

8. The reel configuration component parts of claim 5, wherein
   two rows of welding ribs are disposed in the radial direction.

9. The reel configuration component parts of claim 3, wherein among the welding ribs, a length along the radial direction from a radial direction inside end portion of a welding rib formed at the radial direction innermost side to the radial direction outside end portion of a welding rib formed at the radial direction outermost side is 50% of the thickness of the hub, or greater.

10. The reel configuration component parts of claim 4, wherein among the welding ribs, a length along the radial direction from a radial direction inside end portion of a welding rib formed at the radial direction innermost side to the radial direction outside end portion of a welding rib formed at the radial direction outermost side is 50% of the thickness of the hub, or greater.

11. The reel configuration component parts of claim 5, wherein among the welding ribs, a length along the radial direction from a radial direction inside end portion of a welding rib formed at the radial direction innermost side to the radial direction outside end portion of a welding rib formed at the radial direction outermost side is 50% of the thickness of the hub, or greater.

12. The reel configuration component parts of claim 6, wherein among the welding ribs, a length along the radial direction from a radial direction inside end portion of a welding rib formed at the radial direction innermost side to the radial direction outside end portion of a welding rib formed at the radial direction outermost side is 50% of the thickness of the hub, or greater.

\* \* \* \* \*